US010093567B2

(12) United States Patent
Park et al.

(10) Patent No.: US 10,093,567 B2
(45) Date of Patent: Oct. 9, 2018

(54) BALLAST WATER AND FISH FARM TREATMENT SYSTEM

(71) Applicant: Korea Institute of Ocean Science & Technology, Gyeonggi-do (KR)

(72) Inventors: Yong Joo Park, Seoul (KR); Sun Wan Hwang, Gyeonggi-do (KR); Jung Goo Myoung, Gyeonggi-do (KR); Jang Geun Lim, Gyeonggi-do (KR)

(73) Assignee: KOREA INSTITUTE OF SCIENCE & TECHNOLOGY, Gyeonggi-Do (KR)

( * ) Notice: Subject to any disclaimer, the term of this patent is extended or adjusted under 35 U.S.C. 154(b) by 69 days.

(21) Appl. No.: 15/381,888

(22) Filed: Dec. 16, 2016

(65) Prior Publication Data

US 2018/0050940 A1    Feb. 22, 2018

(30) Foreign Application Priority Data

Aug. 22, 2016    (KR) .......................... 10-2016-0106390

(51) Int. Cl.
    *C02F 1/00*    (2006.01)
    *C02F 1/76*    (2006.01)
    (Continued)

(52) U.S. Cl.
    CPC .............. *C02F 1/76* (2013.01); *A01K 63/045* (2013.01); *B01F 3/04531* (2013.01);
    (Continued)

(58) Field of Classification Search
    CPC ...... A01K 63/04; A01K 63/045; B01D 21/00; B01D 21/0012; B01D 21/02;
    (Continued)

(56) References Cited

U.S. PATENT DOCUMENTS 3,923,652 A  * 12/1975  Condolios .............. B01D 21/00
                                                    210/738
5,816,181 A  * 10/1998  Sherman, Jr. ........... B63B 57/00
                                                    114/125

(Continued)

FOREIGN PATENT DOCUMENTS

KR    2020000018862    10/2000
KR    2020050032195    11/2005

(Continued)

OTHER PUBLICATIONS

KR101435400B1 Park et al.—Chlorine dioxide generator for ballast water sterilization (Bib & MT; Oct. 8, 2012; 24 pages).*

*Primary Examiner* — Hayden Brewster
(74) *Attorney, Agent, or Firm* — Yakov S. Sidorin; Quarles & Brady LLP (57) ABSTRACT

The ballast water and fish farm treatment system for circulating effluent water of a fish farm or a ship by filtering and resupplying the effluent water, the system including a heat exchange system to heat or cool the effluent water, a physical filtration unit to filter out impurities from the effluent water are discharged from the heat exchange system, and a chemical filtration unit to mix the effluent water discharged from the physical filtration unit with chlorine dioxide, wherein the effluent water discharged from the chemical filtration unit is resupplied to the fish farm or the ship. The ballast water and fish farm treatment system allows circulation water of the ship and fish farm to be reused after completely removing parasites, hazardous organisms, germs, and viruses from the circulation water using a combination of physical, chemical and physiological treatment techniques.

11 Claims, 4 Drawing Sheets

(51) Int. Cl.
*A01K 63/04* (2006.01)
*B01F 7/00* (2006.01)
*B01F 7/04* (2006.01)
*B01F 7/08* (2006.01)
*B01F 15/06* (2006.01)
*B63J 4/00* (2006.01)
*B01F 15/00* (2006.01)
*B01F 3/04* (2006.01)
*B01D 21/00* (2006.01)
*C02F 103/00* (2006.01)
*C02F 103/20* (2006.01)

(52) U.S. Cl.
CPC .............. *B01F 7/003* (2013.01); *B01F 7/004* (2013.01); *B01F 7/0035* (2013.01); *B01F 7/00208* (2013.01); *B01F 7/00416* (2013.01); *B01F 7/00425* (2013.01); *B01F 7/00566* (2013.01); *B01F 7/00633* (2013.01); *B01F 7/00908* (2013.01); *B01F 7/00916* (2013.01); *B01F 7/048* (2013.01); *B01F 7/086* (2013.01); *B01F 15/00883* (2013.01); *B01F 15/065* (2013.01); *B63J 4/002* (2013.01); *C02F 1/004* (2013.01); *B01F 2003/04907* (2013.01); *B01F 2015/062* (2013.01); *B01F 2215/0052* (2013.01); *C02F 2103/008* (2013.01); *C02F 2103/20* (2013.01); *C02F 2209/29* (2013.01); *C02F 2303/04* (2013.01)

(58) Field of Classification Search
CPC ...... B01F 7/00208; B01F 7/003; B01F 7/004; B01F 7/00416; B01F 7/00425; B01F 7/00566; B01F 7/00633; B01F 7/048; B01F 7/086; B01F 15/065; B01F 2015/062; B01F 2215/0052
See application file for complete search history.

(56) References Cited

U.S. PATENT DOCUMENTS

| | | | | |
|---|---|---|---|---|
| 6,136,246 | A | * | 10/2000 | Rauwendaal ....... B29C 47/0825 264/211.21 |
| 2003/0015481 | A1 | * | 1/2003 | Eidem ...................... C02F 1/78 210/760 |
| 2008/0017591 | A1 | * | 1/2008 | Ranade ..................... B63J 1/00 210/767 |
| 2008/0185344 | A1 | * | 8/2008 | Fujisato ............... A01K 63/042 210/703 |
| 2011/0114569 | A1 | * | 5/2011 | Kim ..................... C02F 1/4674 210/739 |
| 2011/0156287 | A1 | * | 6/2011 | Tsai ..................... B01F 3/0446 261/28 |

FOREIGN PATENT DOCUMENTS

| | | |
|---|---|---|
| KR | 1020110022415 A | 7/2011 |
| KR | 10-1180334 B1 | 9/2012 |
| KR | 1020110022415 A | 9/2013 |
| KR | 10-1564244 B1 | 10/2015 |
| KR | 10-1567441 B1 | 11/2015 |

* cited by examiner

BALLAST WATER AND FISH FARM TREATMENT SYSTEM

CROSS-REFERENCES TO RELATED APPLICATIONS

The application claims priority from Korean Application No. 10-2016-0106390 filed on Aug. 22, 2016, the disclosure of which is incorporated herein by reference.

TECHNICAL FIELD

The present disclosure relates to a ballast water and fish farm treatment system, and more particularly, a ballast water and fish farm treatment system which allows circulation water of a ship and a fish farm to be reused after completely removing parasites, hazardous organisms, germs, and viruses from the circulation water using a combination of physical, chemical and physiological treatment techniques.

BACKGROUND

Ballast water is seawater stored in a ship to maintain balance of the ship. Typically, when a ship such as an oil tanker or a cargo ship leaves a port after finishing unloading of cargoes, it fills the left and right ballast tanks with seawater to balance the ship and prevent an event of drift, which is caused by locking of the propeller and buoyancy, to ensure safe voyage. After moving to another port, the ballast water is discharged from the ship in loading cargoes on the ship. However, if ballast water is discharged arbitrarily, it may disturb the marine ecosystem.

A ballast water treatment system refers to an apparatus or facility that removes harmful marine organisms and pathogens from ballast water, detoxifies the harmful marine organisms and pathogens or prevents introduction or discharge of the harmful marine organisms and pathogens in order to prevent the marine ecosystem from being destroyed or disturbed according to movement of ballast water.

There has been a need for prevention and minimization of a risk to the natural environment, human health, properties and resources raised by harmful aquatic organisms and pathogens. To meet the need, the International Maritime Organization adopted the International Convention for the Control and Management of Ship's Ballast Water and Sediments in 2004, obliging installation of a ballast water treatment system compulsory.

Techniques for the ballast water treatment system which have been developed and commercially available in the world are broadly classified into radiation of ultraviolet rays, electrolysis, and ozone injection. Regarding the technique of electrolysis, Korean Patent No. 1180334 discloses a system for parallel control of a ballast water treating apparatus using an electrolysis method. Regarding the technique of radiation of ultraviolet rays, Korean Patent No. 1567441 discloses a ballast water treatment apparatus. Regarding the technique of ozone injection, Korean Patent No. 1564244 discloses a hybrid ballast water treatment system having a pipe type water treatment unit and an ozone micro-bubbles unit.

The conventional ballast water treatment systems remove harmful marine organisms such as viruses from ballast water using radiation of ultraviolet rays, electrolysis or ozone injection, and then the ballast water is discharged to the sea or reused. However, since the ballast water contains not only viral microorganisms but also various other contamination sources which may contaminate or disturb the ecosystem, there is a demand for a water treatment system employing a combination of physical, chemical and physiological treatment techniques. Development of such water treatment system may also be applied to a fish farm treatment system for a fish farm such as a high-population pond farm in which water can be easily contaminated.

SUMMARY

In view of the above, an object of the present disclosure is to provide a ballast water and fish farm treatment system which allows circulation water of a ship and a fish farm to be reused after completely removing parasites, hazardous organisms, germs, viruses from the circulation water using a combination of physical, chemical and physiological treatment techniques.

According to one embodiment of the present disclosure, provided is a ballast water and fish farm treatment system for circulating effluent water of a fish farm or a ship by filtering and resupplying the effluent water, the system including a heat exchange system to heat or cool the effluent water, a physical filtration unit to filter out impurities from the effluent water discharged from the heat exchange system, and a chemical filtration unit to mix the effluent water discharged from the physical filtration unit with chlorine dioxide, wherein the effluent water discharged from the chemical filtration unit is resupplied to the fish farm or the ship.

The heat exchange system may include a high-temperature heat exchange unit to cause the effluent water to perform heat exchange with a heat exchanger of a boiler, a low-temperature heat exchange unit to cause the effluent water to perform heat exchange with a heat exchanger of a cooler, a storage unit to store the effluent water having performed heat exchange with the high-temperature heat exchange unit and the low-temperature heat exchange unit, and a circulation pipe to cause the effluent water stored in the storage unit to perform heat exchange with the high-temperature heat exchange unit and the low-temperature heat exchange unit.

The ballast water and fish farm treatment system may further include a fine oxygen supplier installed in a first pipe to introduce oxygen bubbles into the effluent water, the effluent water moving from the heat exchange system to the physical filtration unit through the first pipe, wherein the physical filtration unit may be formed by stacking a plurality of phosphorus members in multiple layers with a diatomaceous fine cross-sectional membrane attached to one surface of each of the phosphorus members to filter out, destroy and extinguish parasites, germs and viruses in the effluent water, and the oxygen bubbles may be dissolved into the effluent water while passing through fine gaps of the multilayered diatomaceous fine cross-sectional membrane.

The chemical filtration unit may include a chlorine dioxide generator installed in a second pipe to introduce the chlorine dioxide into the effluent water, the effluent water are being discharged from the physical filtration unit into the second pipe, and a mixing means to mix the effluent water with the chlorine dioxide.

The mixing means may include a housing having a cylindrical inner circumferential surface, the effluent water moving in an axial direction of the cylindrical inner circumferential surface, and a screw to rotate about a rotational shaft arranged in parallel with a direction of movement of the effluent water in the housing.

The cylindrical inner circumferential surface of the housing may be provided with a comb-pattern protrusion, wherein the effluent water and the chlorine dioxide may be mixed with each other through friction against the comb-pattern protrusion caused by centrifugal force of the screw.

The screw may be provided with a plurality of through holes, the effluent water and the chlorine dioxide being mixed each other while passing through the through holes.

The screw may include a first screw and a second screw, the first screw and the second screw being spaced from each other in a longitudinal direction of the rotational shaft, wherein each of the first screw and the second screw may be provided with a plurality of insertion holes, the first screw and the second screw being connected to each other by a plurality of wires inserted into the insertion hole.

Each of the wires may include an axial portion inserted into a corresponding one of the insertion holes so as to make a seesaw movement, and a deformation portion to connect the axial portions to each other, the deformation portion being elastically deflected by centrifugal force of the screw and a flow energy of the effluent water, wherein the effluent water and the chlorine dioxide may be mixed with each other by the seesaw movement of the axial portions and elastic deflection of the deformation portion.

According to embodiments of the present disclosure, effluent water is supplied to a fish farm or a ship through a heat exchange system, a fine oxygen supply unit, a physical filtration unit and chemical filtration unit. Thereby, the ballast water and fish farm treatment system allows circulation water of the ship and fish farm to be reused after completely removing parasites, hazardous organisms, germs, and viruses from the circulation water using a combination of physical, chemical and physiological treatment techniques.

DETAILED DESCRIPTION

Reference will now be made in detail to the preferred embodiments of the present disclosure, examples of which are illustrated in the accompanying drawings. In describing the present disclosure, description of well-known functions and constructions are omitted in order not to obscure the subject matter of the present disclosure.

A ballast water and fish farm treatment system of the present disclosure allows circulation water of a ship and a fish farm to be reused after completely removing parasites, hazardous organisms, germs, and viruses from the circulation water using a combination of physical, chemical and physiological treatment techniques.

Figure 1:
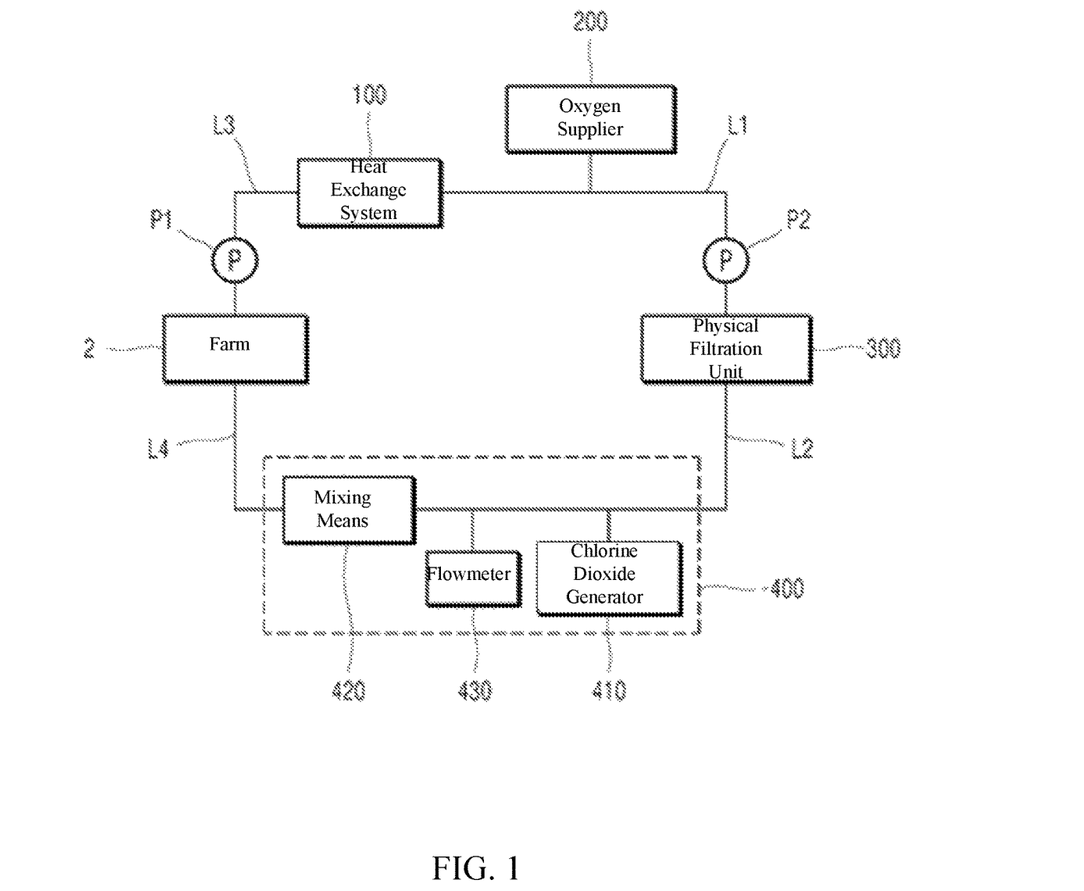
FIG. 1 is a conceptual diagram illustrating overall configuration of a ballast water and fish farm treatment system according to an embodiment of the present disclosure.
Figure 2:
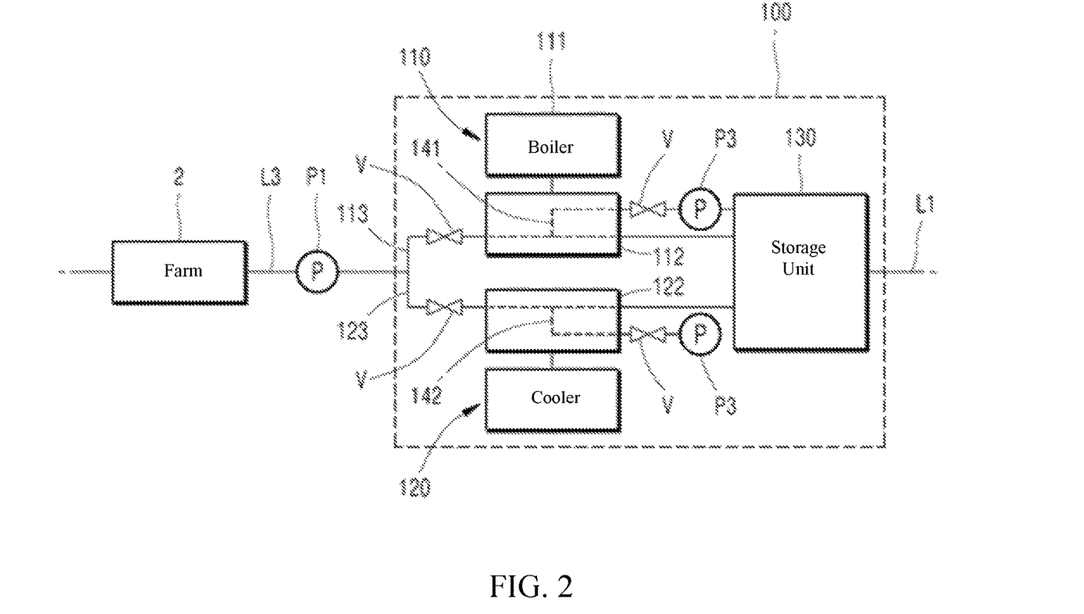
FIG. 2 is a conceptual diagram illustrating a heat exchange system of the ballast water and fish farm treatment system of FIG. 1.
Figure 3:
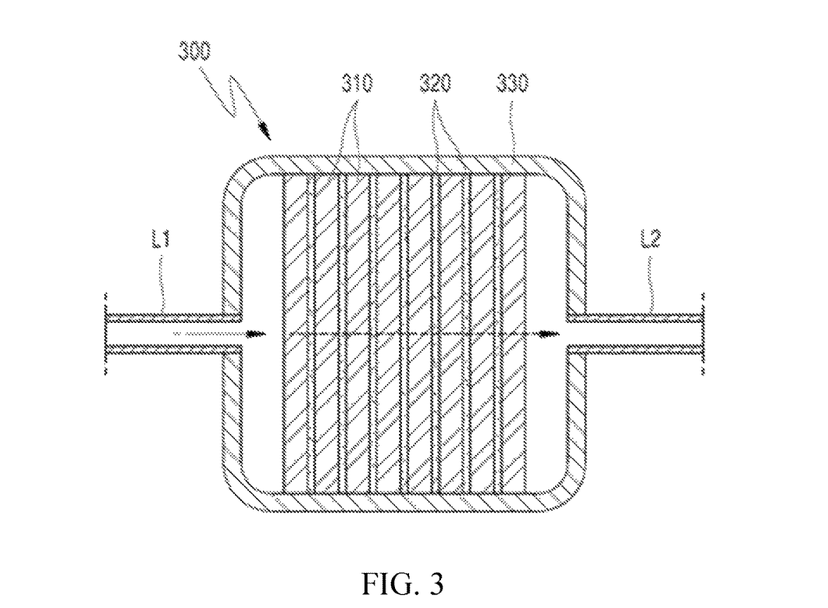
FIG. 3 illustrates a physical filtration unit of the ballast water and fish farm treatment system of FIG. 1.

FIG. 1 is a conceptual diagram illustrating overall configuration of a ballast water and fish farm treatment system according to an embodiment of the present disclosure, and FIG. 2 is a conceptual diagram illustrating a heat exchange system of the ballast water and fish farm treatment system of FIG. 1. FIG. 3 illustrates a physical filtration unit of the ballast water and fish farm treatment system of FIG. 1, and FIGS. 4 to 6 illustrate a mixing means of the ballast water and fish farm treatment system of FIG. 1.

According to an embodiment, as shown in FIG. 1, a ballast water and fish farm treatment system 1 allows effluent water of a ship and a fish farm 2 to be reused after completely removing parasites, hazardous organisms, germs, and viruses from the effluent water using a combination of physical, chemical and physiological treatment techniques. The ballast water and fish farm treatment system 1 includes a heat exchange system 100, a fine oxygen supplier 200, a physical filtration unit 300 and a chemical filtration unit 400. Hereinafter, a description will be given of purifying the effluent water of the fish farm 2.

As shown in FIGS. 1 and 2, the heat exchange system 100 is configured to heat or cool the effluent water. The effluent water of the fish farm 2 is introduced into the heat exchange system 100 through a discharge pipe L3.

A discharge pump P1 to apply pressure to the effluent water of the fish farm 2 toward the heat exchange system 100 is installed in the discharge pipe L3. The heat exchange system 100 includes a high-temperature heat exchange unit 110, a low-temperature heat exchange unit 120, a storage unit 130, and circulation pipes 141, 142.

The high-temperature heat exchange unit 110 includes a boiler 111 and a heat exchanger 112, and causes the effluent water to perform heat exchange with the heat exchanger 112 of the boiler 111. The low-temperature heat exchange unit 120 includes a cooler 121 and a heat exchanger 122, and causes the effluent water to perform heat exchange with the heat exchanger 122 of the cooler 121. The storage unit 130 serves to store the effluent water having performed heat exchange with the high-temperature heat exchange unit 110 and the low-temperature heat exchange unit 120, and is formed in the shape of a large water tank.

As shown in FIG. 2, the discharge pipe L3 is branched into a first branch pipe 113 and a second branch pipe 123 at the back of the discharge pump P1. The effluent water moving along the first branch pipe 113 performs heat exchange with the heat exchanger 112 of the boiler 111 and then introduced into the storage unit. The effluent water moving along the second branch pipe 123 performs heat exchange with the heat exchanger 122 of the cooler 121 and then introduced into the storage unit.

Each of the first branch pipe 113 and the second branch pipe 123 is provided with an on-off valve V. Although not shown in the figure, a third branch pipe (not shown) through which the effluent water from the discharge pipe L3 is directly introduced into the storage unit 130 may also be provided.

Although not shown in the figure, operations of the boiler 111, cooler 121, discharge pump P1, circulation pump P3, and on-off valve V are controlled by a controller (not shown). In addition, each of the discharge pipe L3 of and storage unit 130 is provided with a temperature sensor (not shown). The controller heats or cools the effluent water based on a growth temperature of fish raised in the fish farm 2, which is taken as a reference temperature, to remove viruses from the effluent water.

Fish are classified into warm water fish and cold water fish based on the water temperature of about 20° C. To prevent development of Iridoviruses, the controller opens the on-off valve V of the first branch pipe 113 and closes the on-off valve V of the second branch pipe 123, thereby causing the effluent water to move along the first branch pipe 113 and heating the effluent water at a temperature higher than or equal to 20° C. through heat exchange with the heat exchanger 112 of the boiler 111.

To prevent development of viral haemorrhagic septicaemia (VHS), the controller closes the on-off valve V of the first branch pipe 113 and opens the on-off valve V of the second branch pipe 123, thereby causing the effluent water to move along the second branch pipe 123 and cooling the effluent water to a temperature lower than or equal to 20° C. through heat exchange with the heat exchanger 122 of the cooler 121.

To maintain the temperature of the effluent water, the controller closes the on-off valves V of the first branch pipe 113 and second branch pipe 123, and opens the on-off valve of the third branch pipe, thereby causing the effluent water to move to the storage unit 130 through the third branch pipe.

As shown in FIG. 2, the circulation pipes 141, 142, which are provided to cause the effluent water to perform heat exchange with the high-temperature heat exchange unit 110 and the low-temperature heat exchange unit 120, includes a high-temperature circulation pipe 141 and low-temperature circulation pipe 142.

The high-temperature circulation pipe 141 connects the storage unit 130 to the first branch pipe 113, and is provided with a circulation pump P3 and an on-off valve V. The low-temperature circulation pipe 142 connects the storage unit 130 to the second branch pipe 123, and is provided with a circulation pump P3 and an on-off valve V, similar to configuration of the high-temperature circulation pipe 141.

To prevent development of Iridoviruses, when the controller senses that the temperature of the effluent water stored in the storage unit 130 is less than or equal to 20° C., it opens the on-off valve V of the high-temperature circulation pipe 141 and operates the circulation pump P3 to cause the effluent water to move along the high-temperature circulation pipe 141 and perform heat exchange with the heat exchanger 112 of the boiler 111 such that the effluent water is heated at a temperature higher than or equal to 20° C.

In addition, to prevent development of viral haemorrhagic septicaemia (VHS), when the controller senses that the temperature of the effluent water stored in the storage unit 130 is higher than or equal to 20° C., it opens the on-off valve V of the low-temperature circulation pipe 142 and operates the circulation pump P3 to cause the effluent water to move along the low-temperature circulation pipe 142 and perform heat exchange with the heat exchanger 112 of the cooler 121 such that the effluent water is cooled to a temperature lower than or equal to 20° C.

As shown in FIG. 1, the fine oxygen supplier 200 serves to increase concentration of oxygen in the effluent water, namely, dissolved oxygen. The fine oxygen supplier 200 is installed in a first pipe L1, along which the effluent water moves from the heat exchange system 100 to the physical filtration unit 300. Thereby, the fine oxygen supplier 200 introduces oxygen bubbles into the effluent water.

The dissolved oxygen represents the amount of oxygen contained in water, and is used as a water contamination indicator. The most typical type of contamination of the fish farm is decomposition of organisms. Excessive reproduction of microorganisms in water depletes dissolved oxygen, threatening the existence of fish. Accordingly, dissolved oxygen needs to be raised to a certain level. As the fine oxygen supplier 200, various well-known apparatuses including the air diffusion type and machine type as disclosed in Korean Patent Application Publication No. 2016-0085801 and Korean Patent No. 988361 may be employed.

As shown in FIGS. 1 and 3, the physical filtration unit 300 serves to filter out impurities from the effluent water discharged from the heat exchange system 100. The physical filtration unit 300 is formed by stacking a plurality of phosphorus members 310 with a diatomaceous fine cross-sectional membrane 320 attached to one surface of each of the phosphorus members 310. A pressure pump P2 to pressurize the effluent water may be installed in the first pipe L1 and positioned in front of the physical filtration unit 300.

The phosphorus member 310 is formed of a nonwoven fabric material, and the diatomaceous fine cross-sectional membrane 320 is formed by passing diatomite-dissolved water through one surface of the phosphorus member 310 for a certain time. The phosphorus members 310 are stacked in multiple layers with the diatomaceous fine cross-sectional membranes 320 interposed therebetween. To prevent the stack from being deformed by a water pressure, the stack is surrounded by a mesh (not shown) and installed in the filter housing 330.

The effluent water introduced into the filter housing 330 through the inlet of the filter housing 330 passes through the phosphorus members 310, stacked in multiple layers, and the diatomaceous fine cross-sectional membrane 320 in order. Thereby, impurities such as parasites and microorganisms whose size is greater than or equal to 0.01 μm are filtered out, and the filtered effluent water is discharged from the filter housing 330 through the outlet of the filter housing 330. While the effluent water passes through the phosphorus members 310 and diatomaceous fine cross-sectional membrane 320 in order, oxygen bubbles are completely dissolved in the effluent water through the fine gaps of the diatomaceous fine cross-sectional membranes 320.

As shown in FIG. 1, the chemical filtration unit 400 serves to mix the effluent water discharged from the physical filtration unit 300 with chlorine dioxide, and includes a chlorine dioxide generator 410, a flowmeter 430, and a mixing means 420.

The chlorine dioxide generator 410, which serves to introduce chlorine dioxide into the effluent water, is installed in a second pipe L2, into which the effluent water is discharged from the physical filtration unit 300.

Aqueous chlorine dioxide is non-chlorine based disinfectant. Aqueous chlorine dioxide is a water-soluble oxidizing agent containing pure dissolved chlorine dioxide gas, which has the strongest power of sterilization, deodorization and bleaching after ozone. The chlorine dioxide generator 410 persistently introduces aqueous chlorine dioxide into the second pipe L2 to maintain content of chlorine dioxide in the effluent water to be less than or equal to 0.25 ppm. As the chlorine dioxide generator 410, various well-known devices as disclosed in Korean Patent Application Publication No. 2010-0059089 and Korean Patent No. 1085840.

The flowmeter 430 to measure a flow amount of the effluent water mixed with aqueous chlorine dioxide is installed behind the chlorine dioxide generator 410. The controller compares the amount of aqueous chlorine dioxide introduced into the effluent water by the chlorine dioxide generator 410 with the flow amount of the effluent water to maintain the content of chlorine dioxide in the effluent water to be less than or equal to 0.25 ppm.

Figure 4:
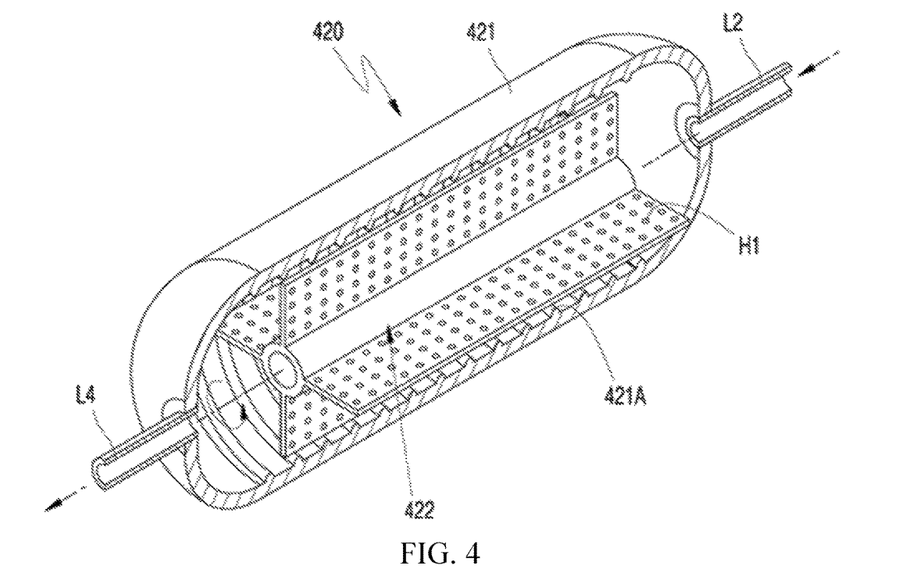
FIGS. 4 to 6 illustrate a mixing means of the ballast water and fish farm treatment system of FIG. 1.

As shown in FIGS. 1 and 4, the mixing means 420 serves to mix the effluent water with chlorine dioxide, and includes a housing 421 and a screw 422.

The housing 421 has a cylindrical inner circumferential surface. The effluent water introduced from the second pipe L2 into the housing 421 moves in the axial direction of the cylindrical inner circumferential surface, and then discharged into a supply pipe L4, which is connected to the fish farm 2. This cylindrical inner circumferential surface of the housing 421 is provided with a comb-pattern protrusion 421A.

As shown in FIG. 4, the screw 422 serves to mix the effluent water with chlorine dioxide using centrifugal force and pressurizing force. The housing 421 rotates about the rotation shaft arranged in parallel with the direction of movement of the effluent water in the housing 421, namely the direction pointing from the second pipe L2 to the supply pipe L4. The effluent water and chlorine dioxide introduced into the housing 421 are uniformly mixed with each other in the housing 421 by centrifugal force produced by rotational power of the screw 422.

The effluent water and chlorine dioxide are mixed with each other through friction against the comb-pattern protrusion 421A caused by the centrifugal force of the screw 422. The comb-pattern protrusion 421A has a comb pattern misaligned with the direction of flow of the effluent water formed by the centrifugal force of the screw 422. Accordingly, friction between the inner circumferential surface of the housing 421 and the effluent water caused by the centrifugal force of the screw 422 increases. The increased friction operates as an energy source for mixing the effluent water with chlorine dioxide.

As shown in FIG. 4, the screw 422 is provided with multiple through holes H1 through which the effluent water and chlorine dioxide are mixed with each other. The main function of the mixing means 420 is to mix the effluent water with chlorine dioxide. As the multiple through holes H1 are formed in the screw 422, a part of the rotational power of the screw 422 is used for frictional force produced when the effluent water passes through the through holes H1, thereby operating as an energy source for mixing the effluent water with chlorine dioxide.

Figure 5:
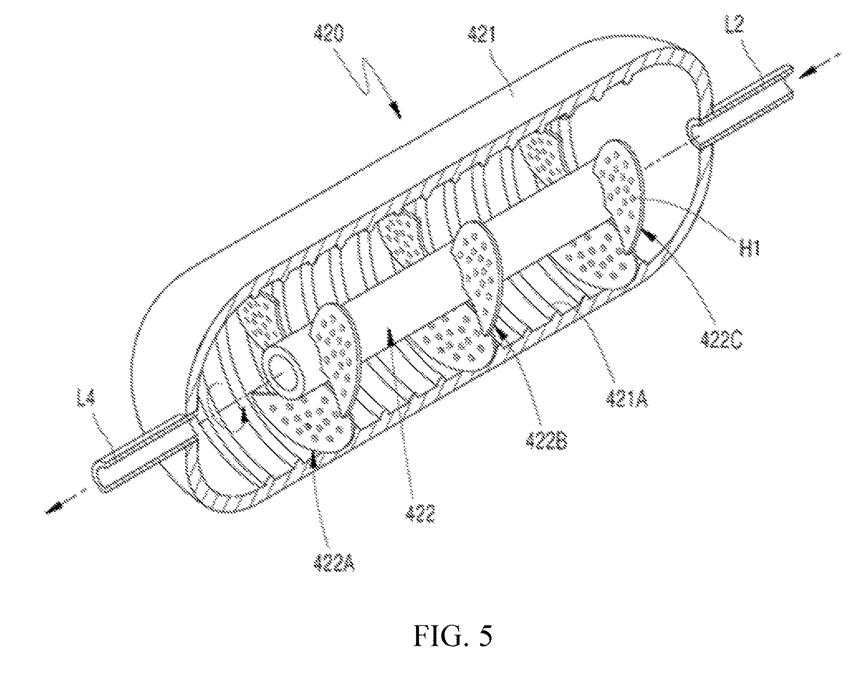

As shown in FIG. 5, the screw 422 may include a plurality of screws arranged spaced from each other in the longitudinal direction of the rotation shaft of the screws 422. While FIG. 5 illustrates that the screws 422 includes a first screw 422A, a second screw 422B, and a third screw 422, the number of the screws 422 is variable.

As shown in FIG. 5, the screw 422 rotates about the rotational shaft arranged in parallel with the direction of movement of the effluent water in the housing 421, namely the direction pointing from the second pipe L2 to the supply pipe L4. The effluent water and chlorine dioxide introduced into the housing 421 are uniformly mixed by centrifugal force and pressurizing force produced by rotational power of the screws 422.

The rotational power of the screws 422 applies pressure to effluent water induced into the housing 421 toward the supply pipe L4. Accordingly, a pump for pressurizing the effluent water need not be installed in the supply pipe L4.

The effluent water and chlorine dioxide are mixed with each other through friction against the comb-pattern protrusion 421A caused by centrifugal force of the screws 422. The comb-pattern protrusion 421A has a comb pattern misaligned with the direction of flow of the effluent water formed by the centrifugal force and pressurizing force of the screws 422. Accordingly, friction between the inner circumferential surface of the housing 421 and the effluent water caused by the centrifugal force and pressurizing force of the screws 422 increases. The increased friction operates as an energy source for mixing the effluent water with chlorine dioxide.

As shown in FIG. 5, the screws 422 are provided with multiple through holes H1 through which the effluent water and chlorine dioxide are mixed with each other. The main function of the mixing means 420 is to mix the effluent water with chlorine dioxide. As the multiple through holes H1 are formed in the screws 422, a part of the rotational power of the screws 422 is used for frictional force produced when the effluent water passes through the through holes H1, thereby operating as an energy source for mixing the effluent water with chlorine dioxide.

Figure 6:
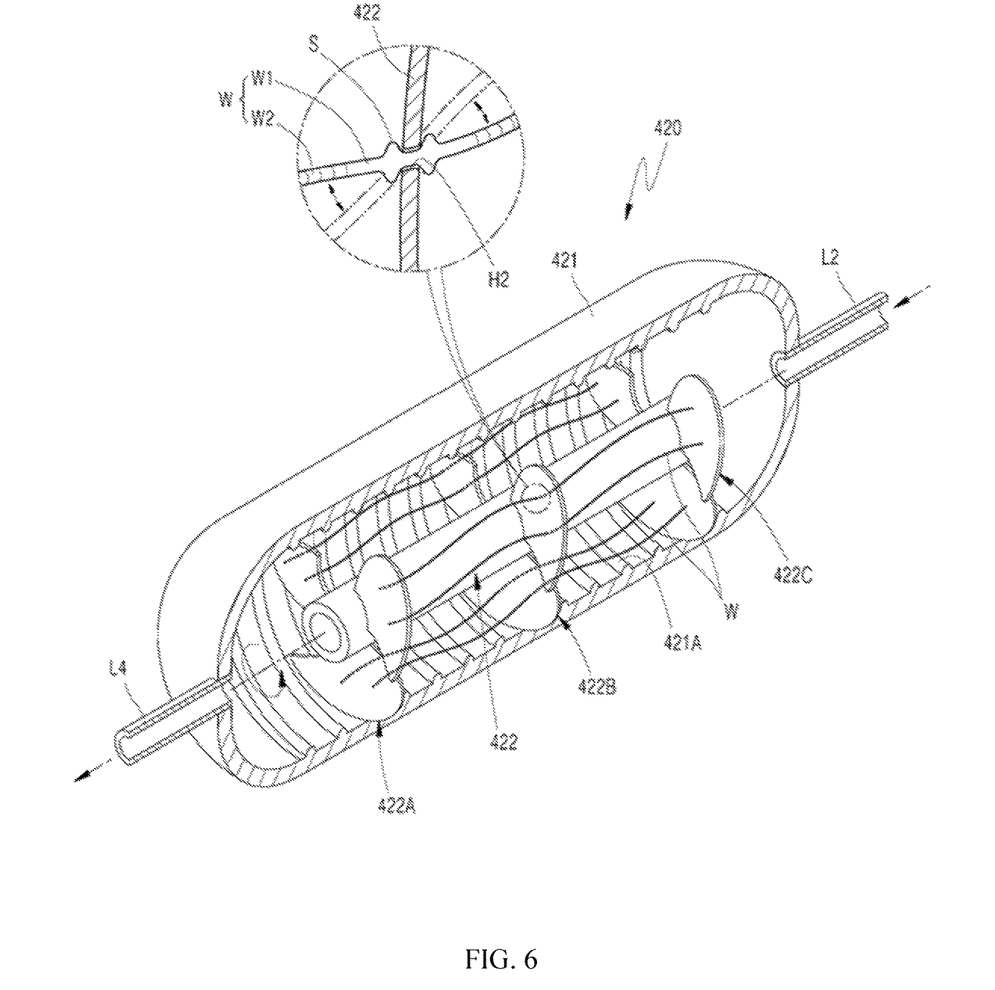

As shown in FIG. 6, each of the first screw 422A, the second screw 422B, and third screw 422 is provided with a plurality of insertion holes H2. The first screw 422A, the second screw 422B, and screw 422 may be connected to each other by a plurality of wires W inserted into the insertion holes H2.

Each of the wires W includes an axial portion W1 and a deformation portion W2.

The axial portion W1 is inserted into the insertion hole H2 so as to make a seesaw movement. The axial portion W1 has a middle portion positioned in the insertion hole H2 and protrusions S formed on both sides of the middle portion. Thereby, when the axial portion W1 is caused to make a seesaw movement with respect to the insertion holes H2 by external force, the axial portion W1 stays insertion into insertion hole H2.

The deformation portion W2 is elastically deflected by centrifugal force of the screws 422 and a flow energy of the effluent water, and connects the axial portions W1 positioned at different screws 422. While the deformation portion W2 is elastically deformed, the axial portion W1 makes a seesaw movement with rigidity thereof maintained without elastic and plastic deformation.

Once the first screw 422A, the second screw 422B and the third screw 422 are connected to each other by the wires W, the deformation portions W2 are caused to rock like a wave between the screws 422 spaced from each other by the rotational power of the screws 422 and a flow energy of the effluent water, and the axial portion W1 is caused to make a seesaw movement with respect to the insertion hole H2 by rocking of the deformation portions W2 to both sides of the axial portion W1.

The effluent water and chlorine dioxide are uniformly mixed with each other between the screws 422 by kinetic energy produced by the seesaw movement of the axial portion W1 and elastic deflection of deformation portions W2.

As described above, the effluent water from the fish farm 2 or a ship is physically, chemically and physiological purified while passing through the heat exchange system 100, fine oxygen supplier 200, physical filtration unit 300, and chemical filtration unit 400. Thereafter, the effluent water is resupplied to the fish farm 2 or the ship.

According to embodiments of the present disclosure, effluent water is resupplied to a fish farm or a ship via the heat exchange system, fine oxygen supplier, physical filtration unit, and chemical filtration unit. Thereby, the ballast water and fish farm treatment system allows circulation water of the ship and the fish farm to be reused after completely removing parasites, hazardous organisms, germs, and viruses from the circulation water using a combination of physical, chemical and physiological treatment techniques.

Although the exemplary embodiments of the present disclosure have been described illustrative purposes, those skilled in the art will appreciate that various modifications, additions and substitutions are possible, without departing from the scope of the disclosure as defined by the appended claims. Accordingly, such modifications, additions and substitutions should also be understood to fall within the scope of the present disclosure.

What is claimed is:

1. A ballast water and fish farm water treatment system for circulating effluent water from a source by filtering and resupplying the effluent water, the system comprising:
   a heat exchange system;
   a physical filtration unit connected to the heat exchange system via a first pipe and in fluid communication with the heat exchange system;
   a chemical filtration unit connected to the physical filtration unit via a second pipe and in fluid communication with the physical filtration unit; and
   a fine oxygen supplier in fluid communication with the heat exchange system and the physical filtration unit, wherein the fine oxygen supplier is connected to the first pipe to introduce oxygen bubbles into the effluent water when the effluent water moves from the heat exchange system to the physical filtration unit through the first pipe,
   wherein:
      the physical filtration unit comprising a plurality of phosphorus members and a plurality of diatomaceous fine cross-sectional membranes, said phosphorous members stacked in multiple layers with a diatomaceous fine cross-sectional membrane attached to one surface of each of said phosphorous members, the physical filtration unit configured to filter out, destroy, and extinguish parasites, germs and viruses in the effluent water and to dissolve the oxygen bubbles into the effluent water while the effluent water passes through fine gaps of the plurality of diatomaceous fine cross-sectional membranes; and
      the water treatment system is configured to resupply the effluent water, discharged from the chemical filtration unit, to the source, wherein the source includes a fish farm or a ship.

2. The ballast water and fish farm water treatment system according to claim 1, wherein the heat exchange system comprises:
   a high-temperature heat exchange unit configured to cause the effluent water to perform heat exchange with a heat exchanger of a boiler;
   a low-temperature heat exchange unit configured to cause the effluent water to perform heat exchange with a heat exchanger of a cooler;
   a storage unit configured to store the effluent water having performed heat exchange with the high-temperature heat exchange unit and the low-temperature heat exchange unit; and
   a circulation pipe configured to cause the effluent water stored in the storage unit to perform heat exchange with the high-temperature heat exchange unit and the low-temperature heat exchange unit.

3. The ballast water and fish farm water treatment system according to claim 1, wherein the chemical filtration unit comprises:
   a chlorine dioxide generator connected to the second pipe and configured to introduce the chlorine dioxide into the effluent water when the effluent water is discharged from the physical filtration unit into the second pipe; and
   a mixing means configured to mix the effluent water with the chlorine dioxide.

4. The ballast water and fish farm water treatment system according to claim 3, wherein the mixing means comprises:
   a cylindrical housing configured to move the effluent water in an axial direction of the cylindrical housing;
   a rotational shaft disposed axially within the cylindrical housing and in parallel with a direction of a movement of the effluent water in the cylindrical housing; and
   a first screw connected to the rotational shaft and configured to rotate about the rotational shaft.

5. The ballast water and fish farm water treatment system according to claim 4, wherein an inner circumferential surface of the cylindrical housing further comprises a comb-pattern protrusion,
   wherein the cylindrical housing is configured to mix the effluent water with the chlorine dioxide by a friction that is generated by applying a centrifugal force of the first screw against the comb-pattern protrusion when the screw rotates.

6. The ballast water and fish farm water treatment system according to claim 4, wherein the first screw further comprises a plurality of holes extending therethrough and is configured to mix the effluent water with the chlorine dioxide while the effluent water and the chlorine dioxide pass through the holes.

7. The ballast water and fish farm water treatment system according to claim 4, further comprising a second screw, wherein:
   the first screw and the second screw are configured to be spaced from each other in a longitudinal direction of the rotational shaft, and
   each of the first screw and the second screw comprises a plurality of insertion holes dimensioned to connect the first screw and the second screw to each other by a plurality of wires inserted through the insertion holes.

8. The ballast water and fish farm water treatment system according to claim 7, wherein each of the plurality of wires comprises:
   an axial portion dimensioned to be inserted into a corresponding insertion hole and to make a seesaw movement; and
   a deformation portion configured to connect one axial portion to another axial portion and to be elastically deflected by a centrifugal force of a rotating screw, from the first or second screws, and a flow energy of the effluent water,
   wherein the axial portions and the deformation portions are configured to mix the effluent water with the chlorine dioxide by the seesaw movement of the axial portions and the elastic deflection of the deformation portions.

9. The ballast water and fish farm water treatment system according to claim 1, wherein each of the plurality of phosphorous members is disposed in parallel to and at a distance from another phosphorous member and is disposed diagonally to the first and second pipes within the physical filtration unit.

10. The ballast water and fish farm water treatment system according to claim 1, wherein each of the plurality of diatomaceous fine cross-sectional membranes is disposed in parallel to and at a distance from another diatomaceous fine cross-sectional membrane and is disposed perpendicularly to the first and second pipes within the physical filtration unit.

11. The ballast water and fish farm water treatment system according to claim 1, wherein the phosphorous members are interposed with the diatomaceous fine cross-sectional membranes.

* * * * *